United States Patent [19]

Adams

[11] 4,168,749
[45] Sep. 25, 1979

[54] HAND-PROPELLED GARDEN CULTIVATOR

[76] Inventor: Joy L. Adams, 216 S. Mauvaisterre, Jacksonville, Ill. 62650

[21] Appl. No.: 893,005

[22] Filed: Apr. 3, 1978

[51] Int. Cl.² ............................................. A01B 35/02
[52] U.S. Cl. ................................... 172/251; 172/136; 172/354; 111/10; 111/7.4
[58] Field of Search ............... 172/136, 375, 683, 250, 172/763, 254, 253, 251, 354

[56] References Cited

U.S. PATENT DOCUMENTS

| | | | |
|---|---|---|---|
| 176,963 | 5/1876 | Johnson | 172/136 X |
| 1,346,701 | 7/1920 | Cochran | 172/136 X |
| 1,652,012 | 12/1927 | Johnson | 172/136 |
| 2,307,930 | 1/1930 | Kucera | 172/245 X |
| 2,357,141 | 8/1944 | Singleton | 172/438 X |
| 2,518,051 | 8/1950 | Nelson | 172/256 |
| 2,578,131 | 12/1951 | Gannon | 172/136 |
| 2,912,774 | 11/1959 | McCrary | 172/683 X |
| 4,079,788 | 3/1978 | Derr | 172/676 |

Primary Examiner—Richard J. Johnson
Attorney, Agent, or Firm—Koenig, Senniger, Powers and Leavitt

[57] ABSTRACT

A hand-propelled cultivator implement having a frame with a wheel journaled on the front of the frame for rollingly supporting the implement as it is moved over the ground. A cage is provided on the frame for rigidly mounting a selected cultivating tool on the frame in a cultivating position for cultivating the soil as the cultivator is moved over the ground and for permitting quick change of one cultivating tool for another. The cultivating tool mounting arrangement further includes a locking member manually movable from a retracted position in which a cultivating tool may be removed from its cage and replaced by another tool and a locking position in which the locking member positively retains the cultivating tool within the cage. In another embodiment, a plurality of tools are rigidly mounted on a rotatable turret, the latter being positively retained in any selected one of a plurality of positions by a movable locking member.

1 Claim, 6 Drawing Figures

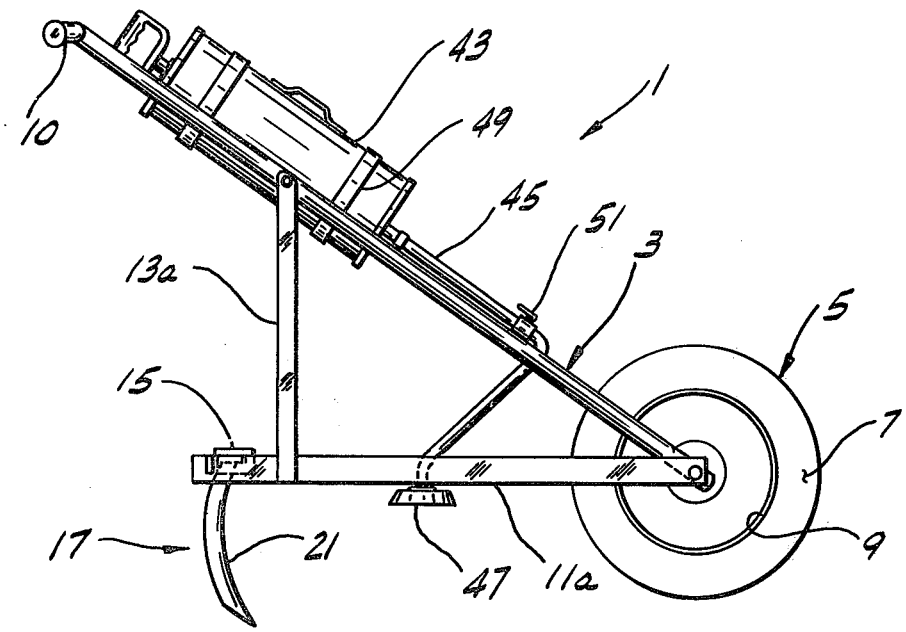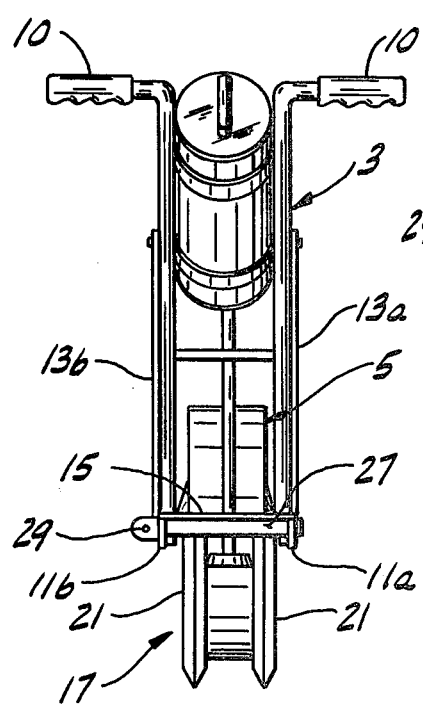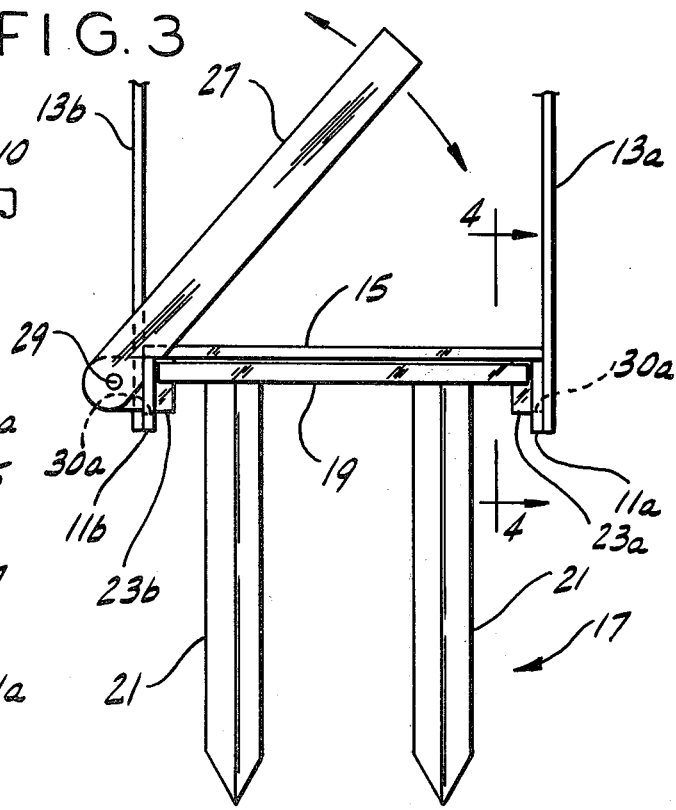

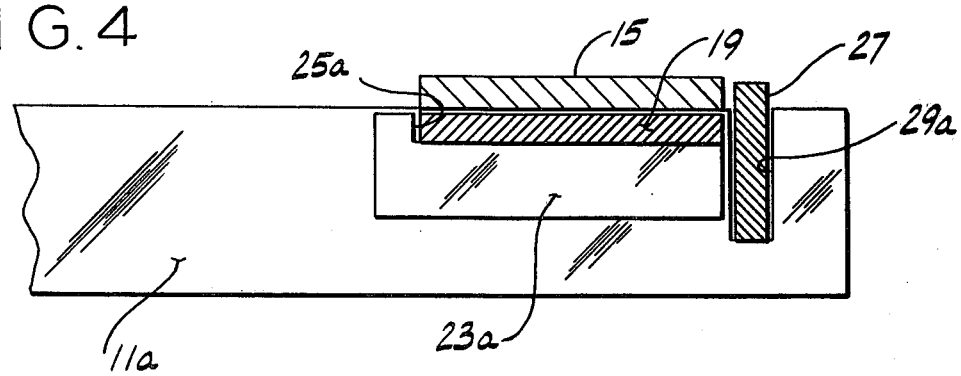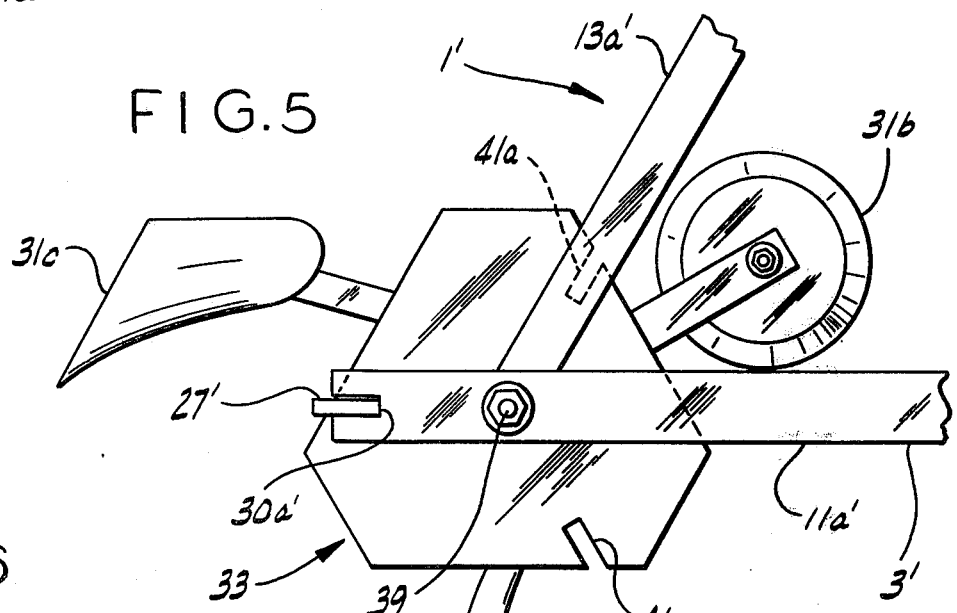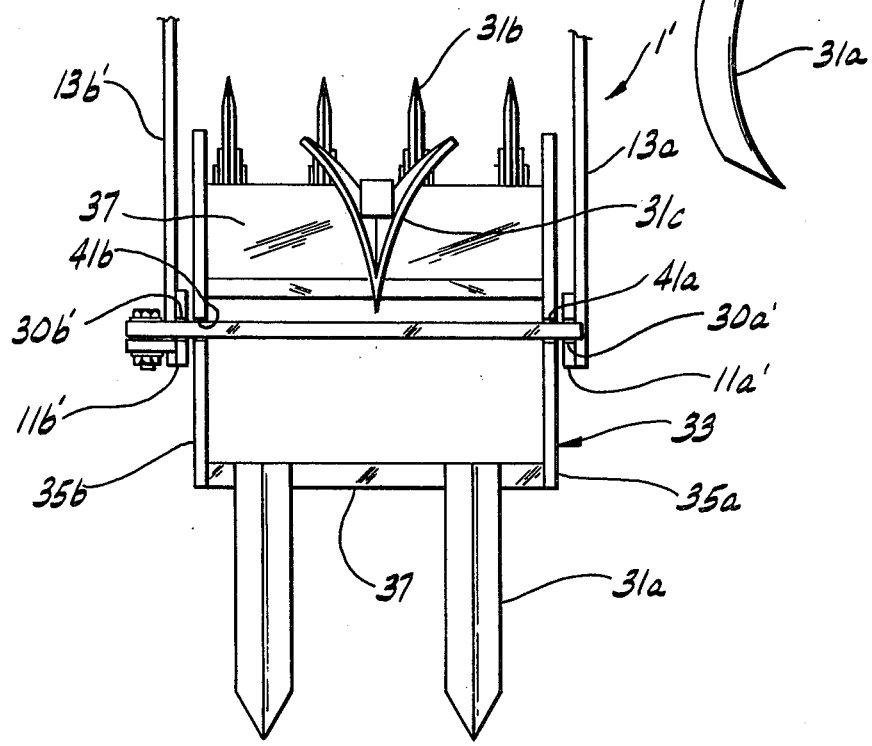

HAND-PROPELLED GARDEN CULTIVATOR

BACKGROUND OF THE INVENTION

This invention relates to garden cultivators and more particularly to hand-propelled garden cultivators.

Hand-propelled garden cultivators are well known and they typically have a relatively large diameter single wheel attached to a frame with rearwardly extending handles and with a cultivator tool rigidly secured to the frame. However, it was difficult to change one type of cultivator tool for another. On many prior cultivators, it was necessary to move and replace several bolts to change cultivator tools when, for example, it was desired to change from a plow shoe tool to a harrow tooth tool.

Reference may be made to such U.S. Pat. Nos. as 2,307,930, 2,357,141, 2,518,051, and 2,578,131 which disclose various cultivator tools in the same general field as the present invention.

SUMMARY OF THE INVENTION

Among the several objects and features of the present invention may be noted the provision of a hand-propelled garden cultivator in which cultivator tools may be readily changed without the use of even simple hand tools or without removal of fasteners; the provision of such a cultivator in which the tool is rigidly secured in its working position; the provision of such a cultivator which is relatively easy to hand propel for cultivation purposes; the provision of such a cultivator which may be readily adapted to simultaneously carry out a multiplicity of gardening tasks including simultaneously cultivating the soil and applying herbicides or insecticides to the soil; the provision of another embodiment of the cultivator tool of this invention in which a plurality of cultivator tools are mounted on a rotary turret and in which a selected cultivator tool may be securely locked in its working position and unlocked to permit another cultivator tool to be moved to its working position; and the provision of such a cultivator which is of rugged and economical construction.

Briefly, a hand-propelled cultivator implement of this invention comprises a frame, and a wheel journaled on the frame for rollingly supporting the implement as it is moved over the ground for cultivating. Means is provided for rigidly mounting a selected cultivating tool on the frame in a cultivating position for cultivating the ground as the cultivator is moved over the ground and for permitting quick change of one cultivator tool for another. The mounting means further includes locking means manually movable from a retracted position in which a cultivator tool may be moved into or from its cultivating position and a locking position in which the cultivator tool is positively retained in its cultivating position. The locking means comprises one or more latch members swingable from a retracted position in which the latch members are clear of the frame so as to readily permit the movement of one cultivator tool from its cultivating position and for replacement with another cultivator tool and a locking position in which the latch member engages the frame and holds the cultivating tool in its cultivating position.

Other objects and features of this invention will be in part apparent and in part pointed out hereinafter.

BRIEF DESCRIPTION OF THE DRAWINGS

FIG. 1 is a side elevational view of a first embodiment of a hand-propelled cultivator of this invention;

FIG. 2 is a rear elevational view of the cultivator shown in FIG. 1;

FIG. 3 is an enlarged view of a portion of the cultivator shown in FIG. 2 illustrating latching means for rigidly holding a cultivator tool in place with a latch member in its retracted position;

FIG. 4 is an enlarged vertical cross-sectional view taken along lines 4—4 of FIG. 3;

FIG. 5 is a side elevational view of a portion of another embodiment of the cultivator of this invention illustrating a rotary turret carrying a plurality of cultivating tools with one end of the cultivating tool shown at the bottom of the turret locked in its cultivating position; and FIG. 6 is a rear elevational view of the turret shown in FIG. 5.

Corresponding reference numbers indicate corresponding parts throughout the several views of the drawings.

BRIEF DESCRIPTION OF PREFERRED EMBODIMENTS

Referring now to the drawings, a hand-propelled cultivator implement of this invention is indicated in its entirety at 1. The cultivator is shown to comprise a rigid frame 3 of steel tubes or the like welded or otherwise rigidly secured together. A wheel 5 is journaled on the front of the frame for rollingly supporting the implement as it is moved over the ground for cultivating the soil. As shown, wheel 5 includes a relatively wide, small diameter pneumatic tire 7 mounted on a wheel rim 9 for rolling over soft or loose soil without substantial penetration into the soil. It will be understood, however, that the conventional large diameter wheels with steel rims such as are commonly used on hand-propelled cultivators and wheels of other designs may be readily used in conjunction with the cultivator of this invention.

Frame 3 extends upwardly and rearwardly from wheel 5 and has a pair of handles 10 thereon which may be readily gripped by the user of the cultivator for manually propelling or pushing the cultivator. The frame further includes a pair of generally horizontal spaced bars 11a, 11b extending rearwardly from the lower portion of the frame and a pair of generally vertical braces 13a, 13b extending upwardly from the rear ends of bars 11a, 11b for rigid connection to the frame. As shown in FIGS. 3 and 4, a cross member 15 extends between and is welded to the rear ends of bars 11a, 11b.

A cultivating tool, as generally indicated at 17, is held on frame 3 in a cultivating position for cultivating the soil as cultivator 1 is moved over the ground. In accordance with this invention, one cultivator tool may be quickly and easily removed from the cultivator and replaced with another without the use of even simple hand tools and without the removal of even simple fasteners (e.g., bolts). As shown, cultivator tool 17 includes a tool head 19 having a length only slightly less than the width between the inside faces of bars 11a, 11b. Earth working tools 21, for example two harrow teeth, are welded to the bottom face of the tool head and extend downwardly for working engagement with the soil. It will be understood that the cultivator tool may carry a cultivating shoe, a plow, or any other desired earth working tool in place of the harrow teeth illustrated. As best shown in FIGS. 3 and 4, bars 11a, 11b each have a respective lug 23a, 23b welded to their inside faces with the upper edges of these lugs being spaced below cross member 15 for receiving the ends of tool head 19. Lugs 23a, 23b each have a respective upwardly extending front shoulder 25a, 25b which engages the forward face of tool head 19 so as to prevent forward movement of the tool relative to bars 11a, 11b.

A locking or latch bar 27 is hingedly mounted on bar 11b, as at 29, for swinging vertically between a raised retracted or unlocked position (as it is shown in FIG. 3) in which it is clear of cultivating tool 17 for permitting the cultivating tool to be readily inserted in or to be readily removed from the cultivator and a lowered locking position (as shown in FIGS. 2 and 4) in which the outer end of the latch bar fits into an upwardly opening slot 30a in bar 11a and an upwardly opening slot 30b in bar 11b immediately behind cross member 15. With latch bar 27 in its lowered locking position and with the cultivator tool installed on the cultivator as shown in FIG. 4, tool head 19 of the cultivator tool (and hence the cultivator tool) is securely held in a cage defined by lugs 23a, 23b, by lug shoulders 25a, 25b, by cross member 15 and by latch bar 27. Thus, this cage constitutes means for rigidly mounting cultivator tool 17 on frame 3 in a cultivating position so as to enable the tool to cultivate the soil as cultivator 1 is moved over the ground on its front wheel 5. This cage receives tool head 19 when the latter is slid in forward direction into the cage. The cage further prevents movement of the tool head in a vertical direction and in all horizontal directions except in rearward direction. Latch 27, of course, when in its latching position prevents rearward movement of the tool.

Latch bar 27 is held in its locking position by means of gravity, but it will be readily appreciated, however, that a spring (not shown) may be provided to resiliently bias the locking bar in its locking position or that a clasp (also not shown) may be provided on bar 11a so as to positively hold the locking bar in its lowered position in slots 30a, 30b. Still further, latch bar 27 could be replaced by a pair of relatively short, swingable members (not shown), each of which is pivotally mounted on a respective bar 11a, 11b for swinging between a raised position and a locking position in which they are received by their respective slots 30a, 30b for engagement with the rear edge of tool head 19 when the cultivating tool is inserted in the cultivating tool holder.

In another embodiment of the cultivator of this invention as indicated at 1', and as shown in FIGS. 5 and 6, a plurality of earth working tools 31a, 31b and 31c are rigidly mounted on a turret 33. This turret is shown to comprise a pair of parallel plates 35a, 35b spaced apart by spacers 37, the latter having the above-mentioned earth working tools rigidly affixed thereto. Plates 35a, 35b are rotatably mounted on an axle 39 which in turn is carried on the rear ends of horizontal bars 11a', 11b'. Plates 35a, 35b each have a plurality of notches 41a, 41b therein, there being three notches 41a in plate 35a and three notches 41b in plate 35b. Bar 11b' has a locking latch bar 27' pivotally mounted thereon and each bar 11a', 11b' has a respective rearwardly facing notch 30a', 30b' therein. Locking bar 27' is swingable in a generally horizontal plane betwen a retracted position (not shown) in which it is clear of turret 33 thereby to permit rotation of the turret about its axle 39 for ready movement of one cultivating tool from its cultivating position and for replacement with another tool in its cultivating position, and a locking position (as shown in FIGS. 5 and 6) in which it is received by notches 30a' and 30b' in bars 11a' and 11b', respectively, and by a respective pair of notches 41a, 41b in plates 35a, 35b thereby to fixedly lock the turret in a selected position relative to frame 3' so as to lock a selected cultivating tool 31a, 31b or 31c in its selected cultivating position. As mentioned above in regard to cultivator 1, latching bar 25' of cultivator 1' may be spring biased toward its locking position or a clasp may be provided to positively retain the latch member in its locking position.

Referring back to FIG. 1, a tank 43 is shown mounted on frame 3. This tank may, for example, be an air pressure spray tank which is conventionally used for spraying insecticides, fertilizer, and the like while gardening. The spray tank has a hose 45 leading therefrom which is connected to a spray head 47 supported by bars 11a, 11b immediately in front of the cultivating tool 17. The spray head may of course be positioned at any desired location on the cultivator, such as immediately to the rear of wheel 5. It will be appreciated with tank 43 filled with a desired insecticide or fertilizer that the insecticide or fertilizer may be sprayed on the soil immediately prior to being cultivated by tool 17. Thus, upon propelling cultivator 1 of this invention through the garden, the gardener may simultaneously apply fertilizer or insecticide and cultivate the soil.

Tank 43 is shown to be removably mounted on frame 3 by straps 49 thus permitting easy removal of the tank. Hose 45 has a control valve 51 incorporated therein for controlling the flow of liquid to spray head 47.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A hand-propelled cultivator implement comprising:

a frame including a pair of generally horizontal spaced bars extending in generally fore-and-aft direction with respect to the implement, one of the bars having an upwardly facing notch therein;

a wheel journaled on the frame for rollingly supporting said implement as it is rolled over the ground for cultivating the soil; and means for rigidly mounting a selected cultivating tool having a head on said frame in a cultivating position for cultivating the soil as the cultivator is moved over the ground and for permitting quick change of one cultivating tool for another, said tool mounting means comprising a cage rigidly secured to said horizontal spaced bars forward of said notch in said one bar for receiving said tool head when said tool head is slid in one horizontal direction into said cage, the latter substantially preventing movement of said tool head in vertical direction and preventing movement of said tool head in all horizontal directions except the one opposite to said one horizontal direction, locking means manually movable from a retracted position in which a cultivating tool may be moved into or moved from its cultivating position in the cage and a locking position in which it positively retains said cultivating tool in its cultivating position in the cage, said locking means comprising a latch member pivotally mounted on the other of said horizontal spaced bars for swinging between said retracted position in which it is removed from the notch in said one horizontal spaced bar so as to permit the quick change of one cultivating tool for another, and a locking position in which the outer end of the latch member is received in the notch for substantially preventing movement of the tool head in the direction opposite to said one horizontal direction thereby to hold the cultivating tool in its cultivating position.

* * * * *